(12) United States Patent
Huang et al.

(10) Patent No.: US 11,533,534 B2
(45) Date of Patent: Dec. 20, 2022

(54) TECHNIQUES FOR ENABLING ULTRA-HIGH DEFINITION ALLIANCE SPECIFIED REFERENCE MODE (UHDA-SRM)

(71) Applicant: Huawei Technologies Co., Ltd., Shenzhen (CN)

(72) Inventors: Jiong Huang, San Jose, CA (US); Laurence Thompson, Morgan Hill, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/432,125

(22) PCT Filed: Aug. 16, 2019

(86) PCT No.: PCT/US2019/046911
§ 371 (c)(1),
(2) Date: Aug. 19, 2021

(87) PCT Pub. No.: WO2020/171843
PCT Pub. Date: Aug. 27, 2020

(65) Prior Publication Data
US 2022/0109913 A1 Apr. 7, 2022

Related U.S. Application Data

(60) Provisional application No. 62/808,639, filed on Feb. 21, 2019, provisional application No. 62/808,029, filed on Feb. 20, 2019.

(51) Int. Cl.
*H04N 21/4402* (2011.01)
*H04N 21/4363* (2011.01)

(52) U.S. Cl.
CPC ........... *H04N 21/440281* (2013.01); *H04N 21/43635* (2013.01)

(58) Field of Classification Search
CPC ..... H04N 21/440281; H04N 21/43635; H04N 21/234309
See application file for complete search history.

(56) References Cited

U.S. PATENT DOCUMENTS 8,175,298 B2 * 5/2012 Mitani .................... H04N 5/60
381/74
8,201,211 B2 * 6/2012 Proust ................ H04N 21/4432
707/999.203

(Continued)

FOREIGN PATENT DOCUMENTS

CN 101390387 A 3/2009
CN 101971615 A 2/2011

(Continued)

OTHER PUBLICATIONS

Li, W. et al., "Ultra HD Premium Certification Specification Analysis of UHD Alliance Technical Details in the Whole 4K Market", Aug. 1, 2016, 2 pages.

*Primary Examiner* — Michael B. Pierorazio
(74) *Attorney, Agent, or Firm* — Slater Matsil, LLP

(57) ABSTRACT

Techniques for enabling the display of video content is a specified display mode, such as the Ultra-High Definition Alliance Specified Reference Mode (UHDA-SRM). A video source device receives video content as a bitstream in one format that includes a specification of a display mode for the video content. The video source also receives information from a display device or other video sink on the display modes that it supports. If the display device supports the specified display mode, the video provides the video content to the display in a second format, such as HDMI, as a series (Continued)

of frames the specification of the display mode embedded in a blanking interval in each of the frames.

28 Claims, 11 Drawing Sheets

(56) References Cited

U.S. PATENT DOCUMENTS

| | | | | |
|---|---|---|---|---|
| 8,238,726 B2* | 8/2012 | Takatsuji | ........... | H04N 21/2368 386/338 |
| 8,351,624 B2* | 1/2013 | Motomura | ....... | H04N 21/43635 348/706 |
| 8,451,375 B2* | 5/2013 | Ejima | ...................... | H04N 5/04 348/515 |
| 8,479,253 B2* | 7/2013 | Glen | ....................... | H04N 7/163 725/98 |
| 8,692,937 B2* | 4/2014 | Altmann | .................. | H04N 5/04 348/588 |
| 8,922,713 B1* | 12/2014 | Chakrovorthy | .......... | H04N 5/04 348/515 |
| 9,247,289 B2* | 1/2016 | Ichimura | .................. | H04N 5/04 |
| 9,509,887 B2* | 11/2016 | Leyendecker | ..... | H04N 21/4122 |
| 9,626,308 B2* | 4/2017 | Colenbrander | ....... | G06F 3/1423 |
| 10,142,521 B2* | 11/2018 | Winsvold | ......... | H04N 21/43072 |
| 2006/0140265 A1* | 6/2006 | Igler | ................ | H04N 21/43637 386/E9.017 |
| 2006/0149850 A1* | 7/2006 | Bowman | ............ | H04N 21/6373 709/205 |
| 2006/0242314 A1* | 10/2006 | Logvinov | ........ | H04N 21/43076 709/231 |
| 2007/0046835 A1* | 3/2007 | Kim | ................. | H04N 21/42204 348/731 |
| 2007/0157234 A1* | 7/2007 | Walker | ............. | H04N 21/47202 725/38 |
| 2008/0063216 A1* | 3/2008 | Sakata | ................... | H04R 27/00 381/80 |
| 2008/0309830 A1* | 12/2008 | Motomura | ....... | H04N 21/43635 348/E5.122 |
| 2008/0320545 A1* | 12/2008 | Schwartz | ........... | H04N 21/8541 725/135 |
| 2009/0091655 A1* | 4/2009 | Russell | .............. | H04N 21/8106 348/E5.009 |
| 2010/0315553 A1* | 12/2010 | Takatsuji | ............... | G09G 5/006 348/E9.034 |
| 2010/0321479 A1* | 12/2010 | Yang | .................... | H04N 21/816 348/51 |
| 2011/0051002 A1* | 3/2011 | Oh | ........................ | H04N 5/765 348/569 |
| 2011/0068736 A1* | 3/2011 | Chartier | ................... | H02J 7/00 320/137 |
| 2011/0134338 A1* | 6/2011 | Toba | ...................... | H04N 5/765 348/734 |
| 2011/0142245 A1* | 6/2011 | Toba | ................... | H04N 21/436 381/22 |
| 2011/0176057 A1* | 7/2011 | Okamura | ............. | H04N 21/439 348/554 |
| 2011/0234916 A1* | 9/2011 | Fujita | ...................... | H04N 5/60 348/E5.122 |
| 2012/0002562 A1* | 1/2012 | Kawade | ................ | H04N 5/765 370/252 |
| 2012/0042346 A1* | 2/2012 | Yoshida | ............. | H04N 21/4363 725/81 |
| 2012/0133829 A1* | 5/2012 | Nakade | .................... | G09G 5/12 348/E9.034 |
| 2012/0136612 A1* | 5/2012 | Vanderhoff | .......... | H04N 17/004 702/119 |
| 2012/0188456 A1* | 7/2012 | Kuroyanagi | ........... | H04N 5/765 348/731 |
| 2013/0021536 A1* | 1/2013 | Kamida | ........... | H04N 21/43622 348/739 |
| 2013/0051578 A1* | 2/2013 | Chu | ....................... | H04B 15/00 381/94.1 |
| 2013/0051584 A1* | 2/2013 | Higuchi | ............. | H04N 21/8106 381/123 |
| 2013/0201397 A1* | 8/2013 | Ayoub | ..................... | H04R 5/04 381/74 |
| 2014/0068789 A1 | 3/2014 | Watts et al. | | |
| 2014/0193134 A1* | 7/2014 | Maeda | ................... | H04N 5/775 386/231 |
| 2014/0241703 A1 | 8/2014 | Hwang | | |
| 2015/0074729 A1* | 3/2015 | Kim | ................. | H04N 21/4586 725/80 |
| 2015/0077633 A1* | 3/2015 | Lee | .................. | H04N 21/43076 348/515 |
| 2015/0237441 A1* | 8/2015 | Muramatsu | ............. | H04R 3/00 381/120 |
| 2017/0094289 A1 | 3/2017 | Altmann | | |
| 2017/0094342 A1* | 3/2017 | Lugtenberg | ...... | H04N 21/42653 |
| 2017/0244927 A1* | 8/2017 | Kim | ................... | H04N 21/4302 |
| 2017/0317835 A1* | 11/2017 | Nishio | ................. | H04L 9/3263 |
| 2018/0262731 A1* | 9/2018 | Oh | ......................... | H04N 9/641 |
| 2018/0278811 A1* | 9/2018 | Winsvold | ............... | H04N 7/147 |
| 2019/0028691 A1* | 1/2019 | Hinds | ................... | H04L 65/607 |

FOREIGN PATENT DOCUMENTS

| | | |
|---|---|---|
| CN | 104769952 A | 7/2015 |
| CN | 105872649 A | 8/2016 |
| CN | 108024032 A | 5/2018 |
| WO | 2004061699 A1 | 7/2004 |

\* cited by examiner

UHDA Vendor Specific Data Block

| Byte\Bit # | 7 | 6 | 5 | 4 | 3 | 2 | 1 | 0 |
|---|---|---|---|---|---|---|---|---|
| 0 | Vendor Specific Tag Code (=3) | | | Length (=N) | | | | |
| 1 | UHDA IEEE OUI, Third Octet | | | | | | | |
| 2 | UHDA IEEE OUI, second Octet | | | | | | | |
| 3 | UHDA IEEE OUI, First Octet | | | | | | | |
| 4 | Version (=1) | | | | | | | |
| 5 | Rsvd(0) | Rsvd(0) | Rsvd(0) | Rsvd(0) | Rsvd(0) | Rsvd(0) | Rsvd(0) | SRM |
| 6...N | Rsvd(0) | | | | | | | |

*FIG. 8*

UHDA Vendor Specific InfoFrame Packet Header

| Byte\Bit # | 7 | 6 | 5 | 4 | 3 | 2 | 1 | 0 |
|---|---|---|---|---|---|---|---|---|
| HB0 | Packet Type = 0x81 ||||||||
| HB1 | Version = 1 ||||||||
| HB2 | 0 | 0 | 0 | Length=Nv |||||

UHDA Vendor Specific InfoFrame Packet Contents

| Byte\Bit # | 7 | 6 | 5 | 4 | 3 | 2 | 1 | 0 |
|---|---|---|---|---|---|---|---|---|
| PB0 | Checksum ||||||||
| PB1 | UHDA IEEE OUI, Third Octet ||||||||
| PB2 | UHDA IEEE OUI, second Octet ||||||||
| PB3 | UHDA IEEE OUI, First Octet ||||||||
| PB4 | Version (=1) ||||||||
| PB5 | Content Type High Byte ||||||||
| PB6 | Content Type Low Byte ||||||||
| ...PB(Nv) | Rsvd(0) ||||||||

*FIG. 9*

| Cinema Detection Method? / Detection in Source or Sink? | UHDA SEI messages embedded in HEVC or AVC | Cinema Mode detection via local processing |
|---|---|---|
| Sink detects "Director's Mode" | Sink decodes embedded SEI Messages | Sink detects Cinema: 24fps or image processing |
| Source detects "Director's Mode" and communicates with the Sink via HDMI using CTA 861-G structures (EDID, VSDB, VSIF) | Source decodes embedded SEI Messages | Source detects Cinema: 24fps or image processing |

FIG. 10

TECHNIQUES FOR ENABLING ULTRA-HIGH DEFINITION ALLIANCE SPECIFIED REFERENCE MODE (UHDA-SRM)

PRIORITY CLAIM

This application is a national phase filing under section 371 of PCT/US2019/046911, entitled "Techniques for Enabling Ultra-High Definition Alliance Specified Reference Mode (UHDA-SRM)," and filed on Aug. 16, 2019 which claims the priority of U.S. Provisional Patent Application No. 62/808,639, entitled "Techniques for Enabling Ultra-High Definition Alliance Specified Reference Mode (UHDA-SRM)," filed Feb. 21, 2019, and also claims the priority of Provisional Patent Application No. 62/808,029, entitled "Techniques for Enabling Ultra-High Definition Alliance Specified Reference Mode (UHDA-SRM)," filed Feb. 20, 2019, each of which is incorporated herein by reference in their entireties.

TECHNICAL FIELD

The disclosure generally relates to the processing of video data.

BACKGROUND

Video content is often produced with a vision or goal to provide consumers a new differentiated entertainment experience that delivers a premium expression of creative intent using next generation audio-visual technologies. To be able to present this video content in the intended format, the preferred format needs to be provided to the display device. Consequently, there should be a consistent and well defined method to present this presentation information from a source of the video to the display device.

SUMMARY

According to a first aspect of the present disclosure, a method of providing a video signal to a video sink through an HDMI (High-Definition Multimedia Interface) includes receiving at a video source from the video sink information on display modes that the video sink supports for display of a received video signal and receiving video content in a first format at the video source, the video content including data specifying a first display mode. In response to the information from the video sink indicating that the video sink supports the first display mode, the video source formats the video content received in the first format into a video signal in a second format. The video signal in the second format comprises a plurality of frames, each of the frames including a specification to display the video signal in the first display mode embedded in a blanking interval of the frame. The video signal in the second format is transmitted from the video source to the video sink.

Optionally, in a second aspect and in furtherance of the first aspect, the video sink includes a display and the method further includes: applying a predetermined set of image processing techniques by the video sink to the video signal in response to the specification embedded in the blanking interval of the frames; and displaying by the video sink of the processed video signal on the display in the first display mode.

Optionally, in a third aspect and in furtherance of the first and second aspects, in the first format, portions of the video content corresponding to active video are compressed.

Optionally, in a fourth aspect and in furtherance of the preceding aspect, the active video portions of the video content are compressed in a Moving Picture Experts Group (MPEG) format.

Optionally, in a fifth aspect and in furtherance of the preceding aspect, the data specifying a first display mode is received as a supplemental enhancement information (SEI) message.

Optionally, in a sixth aspect and in furtherance of any of the preceding aspects, the video content in the first format is received from an over-the-top (OTT) content source.

Optionally, in a seventh aspect and in furtherance of any of the preceding aspects, the video content in the first format is received from a television antenna.

Optionally, in an eighth aspect and in furtherance of any of the preceding aspects, the video content in the first format is received from an internet connection.

Optionally, in a ninth aspect and in furtherance of any of the preceding aspects, receiving the video content in a first format includes reading by the video source of the video content from a medium.

Optionally, in a tenth aspect and in furtherance of the preceding aspect, the medium is a Blu-ray disc.

Optionally, in a eleventh aspect and in furtherance of the ninth aspect, the medium is a DVD (digital versatile disc).

Optionally, in a twelfth aspect and in furtherance of any of the preceding aspects, receiving at the video source from the video sink information on display modes that the video sink supports for display of received video content include receiving information that the video sink supports a plurality of display modes, including the first display mode and a second display mode that the video sink specifies as a preferred display mode; and including the specification to display the video signal in the first display mode includes the video source instructing the video sink to override the second display mode.

Optionally, in a thirteenth aspect and in furtherance of any of the preceding aspects, the data specifying a first display mode specifies a dynamic range for the display of the video content.

Optionally, in a fourteenth aspect and in furtherance of any of the preceding aspects, the data specifying a first display mode specifies a color gamut for the display of the video content.

Optionally, in a fifteenth aspect and in furtherance of any of the preceding aspects, the data specifying a first display mode specifies a transfer function for the display of the video content.

Optionally, in a sixteenth aspect and in furtherance of any of the preceding aspects, the data specifying a first display mode specifies a definition level for the display of the video content.

Optionally, in a seventeenth aspect and in furtherance of any of the preceding aspects, the data specifying a first display mode specifies a frame rate for the display of the video content.

According to another aspect of the present disclosure, a video source device includes a content source interface, a transmitter interface, and a coder-decoder. The content source interface is configured to receive video content, including data specifying a first display mode, in a first format. The transmitter interface is configured to receive from a video sink information on display modes that the video sink supports for display of a received video signal and to transmit to the video sink a video signal in a second format. The coder-decoder is configured to format the received video content in the first format into a video signal in the second format in response to the information from the video sink indicating that the video sink supports the first display mode, the video signal in the second format comprising a plurality of frames, each of the frames including a specification to display the video signal in the first display mode embedded in a blanking interval of the frame.

According to an additional aspect of the present disclosure, a video system includes a video sink and a video source. The video sink is configured to supply information on display modes that the video sink supports for display of a received video signal, to receive the video signal including a specification to display the video signal in a specified display mode, and to display the video signal in the specified display mode. The video source is configured to: receive video content, including data specifying a first display mode, in a first format; receive from the video sink the information on display modes that the video sink supports for display of a received video signal; and, in response to the information from the video sink indicating that the video sink supports the first display mode, format the received video content in the first format into a video signal in a second format and transmit the video signal in the second format to the video sink, wherein the video signal in the second format comprises a plurality of frames, each of the frames including a specification to display the video signal in the first display mode embedded in a blanking interval of the frame.

According to a further aspect, a method by which a video sink displays video content in a specified display mode includes receiving a video signal at an input of a video sink and detecting a property of video content contained in the received video signal. The received video signal is processed according to a predetermined set of image processing techniques in response to detecting the property of the video content and the received video signal processed according to a predetermined set of image processing techniques is displayed.

According to a further aspect, a video sink for the display of a video content includes an input configured to receive a video signal, one or more video processing circuits, and a display. The one or more video processing circuits are configured to detect a property of video content contained in the received video signal and process the received video signal according to a predetermined set of image processing techniques in response to detecting the property of the video content. The display is configured to display the received video signal processed according to a predetermined set of image processing techniques.

According to a further aspect, a method of providing a video signal to a video sink through an HDMI (High-Definition Multimedia Interface) connection includes receiving at a video source from the video sink information on display modes that the video sink supports for display of a received video signal and receiving a video signal in a first format at the video source. The video source detects that the video content of the received video signal is cinema and, in response to the information from the video sink indicating that the video sink supports a cinema display mode, formats the video content received in the first format into a video signal in a second format, the video signal in the second format comprising a plurality of frames, each of the frames including a specification to display the video signal in the cinema display mode embedded in a blanking interval of the frame. The video signal is transmitted in the second format from the video source to the video sink. A predetermined set of image processing techniques are applied by the sink to the video signal in response to the specification to display the video signal in the cinema display mode embedded in the blanking interval of the frames, and the frames of the processed video signal are displayed in the cinema display mode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Aspects of the present disclosure are illustrated by way of example and are not limited by the accompanying figures for which like references indicate elements.

FIG. 8 illustrates a format for a UDHA vendor specific data block.

FIG. 9 illustrates a format for a UDHA vendor specific InfoFrame.

FIG. 10 is a 2×2 table to illustrate the different modes for implementing a specified display mode.

DETAILED DESCRIPTION OF ILLUSTRATIVE EMBODIMENTS

Figure 1:
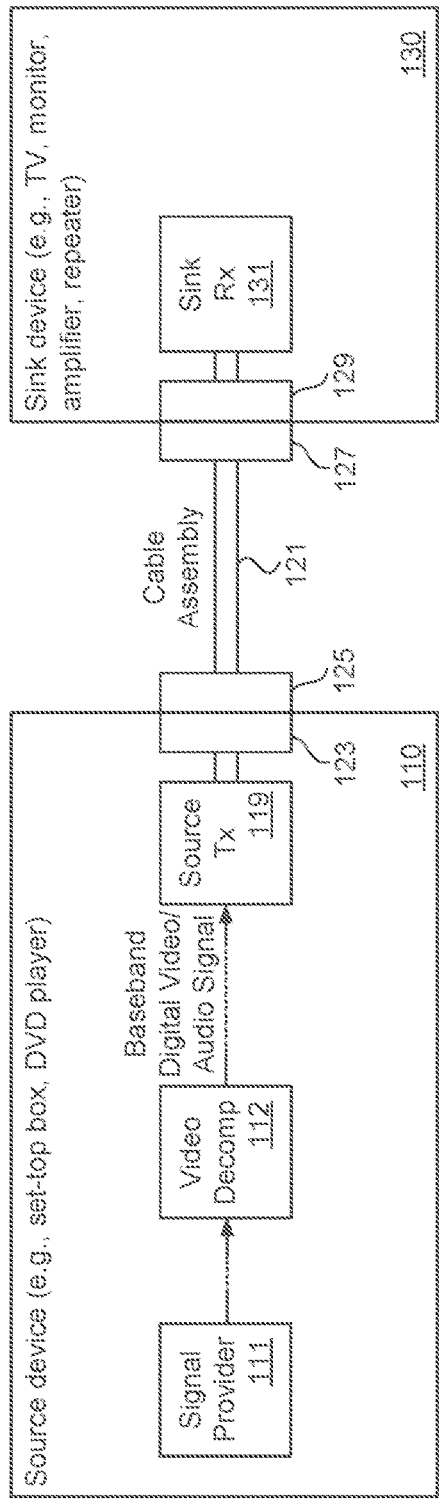
FIG. 1 illustrates a video system including a video source connected to a video sink with a cable assembly.

The present disclosure will now be described with reference to the figures, which in general relate to the processing and transmission of video signals.

Video content is often created with the intention that it will be presented in a particular way, such as would reflect a director's intention for the display of film or cinema content. A television or other display may have a number of different formats and variables in how it processes received content for presentation, which may or may not include the preferred mode of the content creator. When a display device receives content directly from an over-the-top (OTT) content provider or through a standard audio/video interface, such as HDMI (High-Definition Multimedia Interface), the content may specify information about the preferred display mode, sometimes referred to as a "Director's Mode". Alternatively, the television or display may enter the "Director's Mode" by internally detecting the presence of cinema content. The following presents techniques to consistently provide Director's Mode signaling information to a television or other display device along with the content, or to detect that the content is a cinema type in a way that can be used across a wide variety of video source and television devices and take into account the capabilities of the display device.

More specifically, video content may be provided to a television (other display, or, more generally, other video sink) through multiple paths. A television can receive video content directly through over-air broadcasts, or the television can receive video content directly through a connection to the internet (OTT). A television can receive video content through a local connection—such as an HDMI Interface—to a video source device, such as a Blu-Ray disc player, cable or satellite set-top box, or internet connected source device. Whether the video content reaches the television directly, or through an HDMI connection to a video source, the video content may include embedded data that specifies that video content is a cinema type and shall be presented using Director's Mode processing. In some instances, the embedded data that specifies that the video content is cinema type may not be present. In these instances, the content may be displayed using Directors Mode processing by local detection that the video type is cinema through measuring the frame rate of 24 fps, or by other processing methods essentially detecting content motion rate of 24 fps. The detection that the video type is cinema may be done in the sink if the video content is received directly by the sink, or it may be done in the source if the video content is received by a source device which is connected to the sink through an HDMI interface. When the video source provides the video signal through an HDMI interface, the video is transmitted as a sequence of frames, the specification to display the video signal in the specified display mode can be embedded in the blanking intervals of the frames.

It is understood that the present embodiments of the disclosure may be implemented in many different forms and that scope of the claims should not be construed as being limited to the embodiments set forth herein. Rather, these embodiments are provided so that this disclosure will be thorough and complete and will fully convey the concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

To place the discussion into a more concrete context, the following discussion will primarily refer to the example of the Ultra-High Definition Alliance (UHD-Alliance or UHDA) protocol. The UHD-Alliance is a Standards Development Organization (SDO) with the goals of providing consumers with new differentiated entertainments experience that can deliver a premium expression of creative intent using advances in audio-visual technologies. In this regard, UHD-A has defined the requirements of UHDA Specified Reference Mode (UHDA-SRM), a.k.a. Director's Mode, or Filmmaker's Mode, for Standard Dynamic Range (SDR) and High Dynamic Range (HDR) Display Devices. The UHDA-SRM specification reflects the advice of content creators regarding their "creative content" and how to recreate those preferred conditions when using consumer displays to reproduce, as closely as possible, that creative intent: The experience that the author intended. UHDA-SRM specifies image processing requirements for the Director's Mode. UHDA-SRM also specifies how Director's Mode is enabled in a display. There are several approaches for methods to enable Director's Mode, this; however, some of these approaches can have problems.

The Technical Specification of UHDA-SRM defines several methods to activate UHDA-SRM: Content Type Setting in a UHDA-specific SEI (Supplemental Enhancement Information) message of High Efficiency Video Coding (HEVC)/Advanced Video Coding (AVC) compressed bitstream; Content Type Setting, such as in an HDMI AVI (Auxiliary Video Information)) InfoFrame; or a button on a remote control. With Content Type indicated as "Cinema", the device is required to automatically switch to UHDA-SRM, or to prompt the users with the option to switch.

There drawbacks with these approaches. For example, the AVI InfoFrame is defined by the Consumer Technology Association (CTA) and is specified in the standards documents for CTA-861, such as CTA-861-G. This standard is incorporated into HDMI by reference. The AVI Info Frame has been defined for many years and may be used by millions of HDMI Source devices. While CTA-861 does define a Cinema bit, it does not describe the conditions under which this bit should be used, so that its function is not well defined and may already be used for other purposes in some video systems, leading to interoperability issues. UHDA should have reliable and uniquely defined signaling using standardized methods for this type of communication between devices.

Use of a remote control button also has back compatibility issues, as such a bottom would not be present on existing remote controls, and would require a change in design for new controls in order add an additional bottom to what is often a device with an already large number of buttons.

Reliable signaling between video sources and display devices is typically achieved in video interface standards by writing requirements for both video sources and displays; however, the current UHD-SRM only applies to displays, and therefore provides no requirements on source devices to transmit signaling to ensure that the display enters UHDA-SRM operation when video content is transmitted to a display over HDMI.

Before providing additional details of techniques for UHD-SRM, FIG. 1 is used to describe an embodiment for some components of a video system. The video system of FIG. 1 includes a video source 110 that provides a video signal to a video sink 130. Examples of a video sink 130 are a television, monitor, other display device or end use device, or may be an amplifier or repeater that would in turn act as a video source for a subsequent element in a video system. On the video sink 130, a receiver circuit Sink Rx 131 receives the signal form the video source 110, where the Sink Rx 131 can include an equalization circuit and other interface elements for the signal received from the video source 110 over a cable or other connector.

The video source 110 provides the video signal to the video sink 130 from a transmitter circuit Source Tx 119. Some examples of a video source 110 are a set-top box, a DVD, Blu-Ray or other media player, or video camera. The video source can be any system-level product to provide a baseband or uncompressed digital video signal.

In the video source 110, the video signal is provided by the signal provider 111. In the example of the DVD or other media player, the signal provider in would read the media to provide the video data. In the example of a set-top box or other device that receives the video signal over a cable or other connector, the video signal is received at a receiver circuit or interface for the signal provider 111. For example, in a set-top box embodiment of a video source no, the set-top box might receive a video signal from a cable provider over a coaxial cable, where the video signal is compressed and encoded according to an MPEG (Moving Picture Experts Group) standard, such as MPEG-4, or other compression algorithm.

As the received video signal will often be compressed, such as with an MPEG-type compression, the stream of received video data can be decompressed at the video decompression block 112 to generate a baseband (i.e., uncompressed) digital video/audio signal. Depending on the embodiment, in some cases (such as a video camera) where video decompression is not needed, the video decompression block 112 need not be included in the video source device 110. The video source 110 can then perform processing on the decompressed stream of video data. For example, in addition to image processing, the video data may be encrypted in some embodiments, formed into packets, have error correction information added, or have other operations performed upon it. Among other processing, this can include functionality to comply with the requirements of an interface standard, such as HDMI, to transmit the video signal to the sink device 130 over the cable assembly 121 as performed in the Source TX 119.

The video signal can be transmitted from the video source 110 to the video sink 130 over a cable assembly 121, of which there are a number of formats such as component video cable, VGA (Video Graphics Array) cables, or HDMI cables, where the HDMI example will be used as the main embodiment for the following discussion. An HDMI cable assembly 121 will be a cable with plugs or connectors 125 and 127 on either end. The plugs 125 and 127 can plug into corresponding sockets or receptacles 123 and 129 to provide video data from the Source Tx 119 to the Sink Rx 131. In a common embodiment, the video data as received at the video source 110 will have the active video (i.e., the pixels of the image to be provided on a television or other display) compressed, but the video data transmitted over the cable assembly 121 to the video sink 130 can have uncompressed or compressed active video portions. For example, the active video may be DSC (Display Stream Compression) compressed, which is a visually lossless low-latency compression algorithm.

Figure 2:
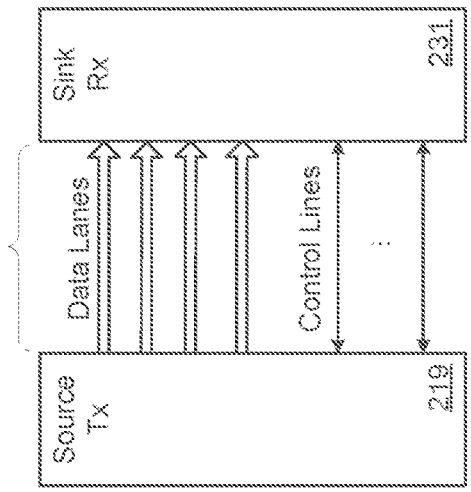
FIG. 2 is a high level functional diagram of the source/sink interface for an HDMI or other standard.

FIG. 2 is a high-level functional diagram of the source/sink interface for an HDMI or other standard. On the left is the Source Tx 219, the arrows in the center represent the signals that are carried in the cable assembly 221 (corresponding to the HDMI cable assembly 121, for example), and on the right is the Sink Rx 231. The video data is transferred over the data lanes, where there can be a number of such lanes to provide high data transfer rates. The shown embodiment has four data lanes, but other embodiments can have more or fewer data lanes. The interface may also be operable in different modes, where less than all of the available data lanes are used in some modes if, for example, the interface is operating at a lower data rate or to provide back-compatibility with earlier versions of a standard. In the shown example, a high data rate four lane mode could use all of the provided data channels, while a three-lane mode can be provided for back compatibility to an earlier version of a standard by repurposing one of the lanes. In some embodiments, the video source on the Source Tx 219 side can configure the link to operate at different bit rates using a fixed rate link. The cable assembly can also have a number of control lines for the exchange of control signals over the source/sink link.

Figure 3:
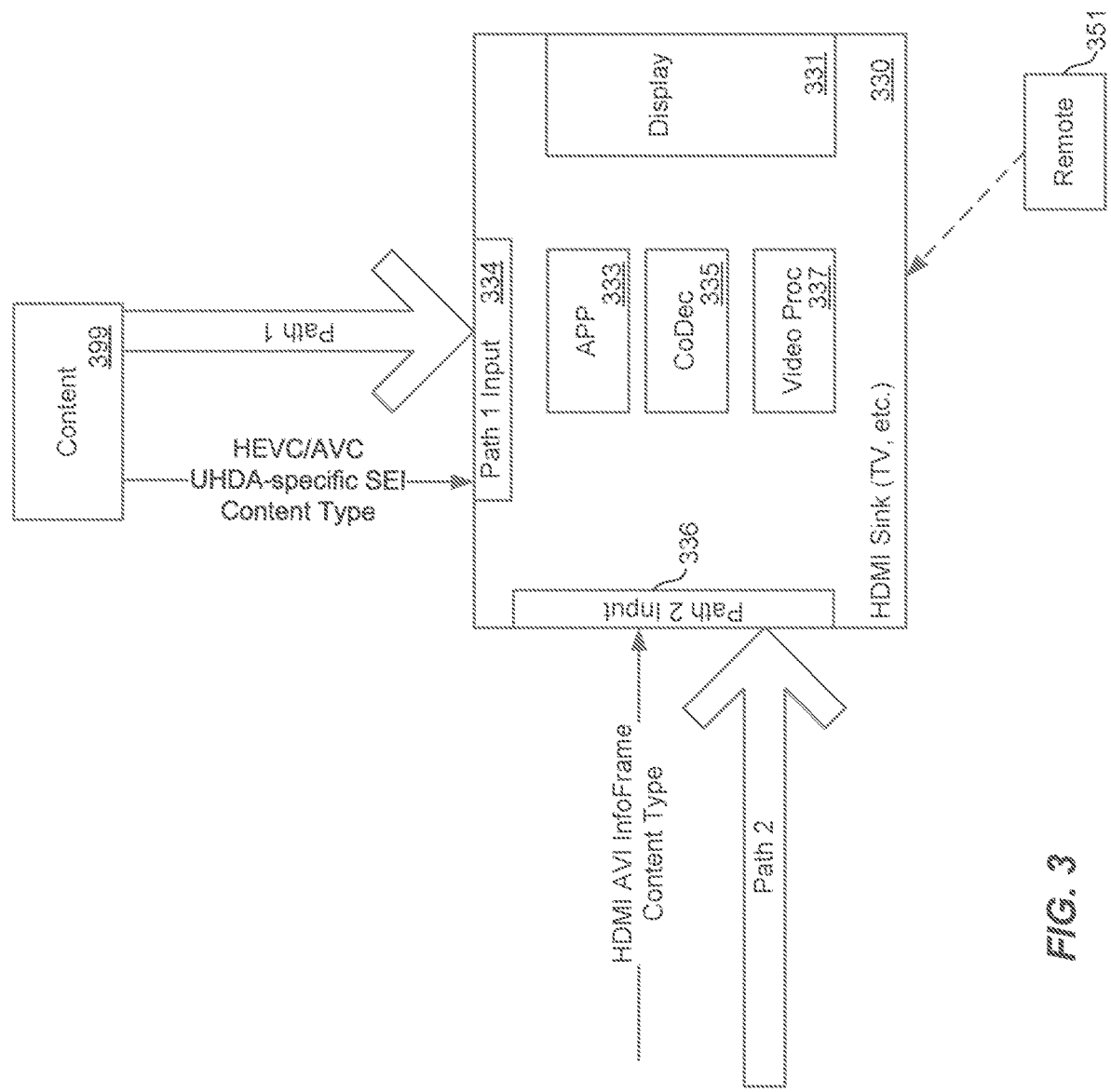
FIG. 3 illustrates a video sink, such as a TV or other display device, receiving video content.

Returning now to techniques for specifying to a display mode for video content to a display device or video sink, FIG. 3 looks at the situation in more detail. In the following, embodiments will primarily be described with respect to the UHDA Specified Reference Mode (UHDA-SRM), or Director's Mode or Filmmaker's Mode, for Standard Dynamic Range (SDR) and High Dynamic Range (HDR) Display Devices, but can also be applied to other examples of where a video specifies a particular mode for the display of content.

FIG. 3 illustrates a video (HDMI in this example) sink 330, such as a TV or other display device, and can correspond to the sink device 130 of FIG. 1, but where different elements relevant to the following discussion are explicitly shown. In particular, the HDMI sink 330 includes a display 331, such as a television screen, for the presentation of video content.

One or more applications, represented at APP 333, can run on the video sink 330 to handle any decoding of video content that is specific to a content provider (e.g., Amazon Prime video, Netflix, or other such services). The video signal can then go to a coder-decoder CoDec 335 that can further decode the video signal, such as decompressing video from an MPEG (Moving Picture Experts Group) format, for example. A video processor 337 can perform any processing to be performed on the video content prior to its presentation on display 331. For example, the video processor 337 can perform any processing that would place the video content into a specified format or mode, such as the UHDA-SRM, for its display. The video sink 330 can perform these functions through software, hardware, firmware, or various combinations of these. For example, the applications of APP 333 and the codec 335 could be implemented through software run on a processing unit and the video processor 337 could be implemented as an application specific integrated circuit (ASIC).

FIG. 3 also illustrates two paths for providing video content and a remote control 351 that can be used to illustrate the three methods mentioned above for activating the specified presentation mode, such as UHDA-SRM. Path 1 is used to illustrate the setting of content type in a UHDA-specific SEI message in an HEVC/AVC compressed bitstream and is received at the Path 1 input 334; Path 2 illustrates use of a content type setting, such as in an HDMI AVI InfoFrame, and is received at Path 2 input 336; and the remote 351 represents the use of a button on the remote control to activate the specified mode.

In Path 1, the video content 399 is input to the video sink 330 at Path 1 input 334 via a non-HDMI path, such as directly using over-the-top (OTT) streaming. The input may be provided as an HEVC/AVC compressed bitstream, where a content type setting could be in a UHDA-specific SEI message embedded in the compressed bitstream. In the Path 1 arrangement, the video content 399 is compressed as a stream of bits, not organized into frames, and the information specifying the content presentation information would be bits in the stream. Content which is input to the video sink 330 over HDMI input can use the AVI InfoFrame "Content Type" signaling, as illustrated in at Path 2. As these two paths use differing methods of presenting the video content and any display mode information, when rendering the same content through Path 1 and Path 2, there is a significant possibility of viewing disparity which may concern both consumers and content creators.

As discussed above, each of the methods of indicating a display mode represented in FIG. 3 has drawbacks. Use of the AVI InfoFrame Content Type illustrated for Path 2 for signaling is unreliable because it has been in use in HDMI for many years, so that its function is not well defined and may already be used for other purposes in some video systems. The SEI bits illustrated with respect to Path 1 are currently not defined for any content, so they are not useful in signaling UHD-SRM unless they are defined for content by UHDA, which may take an extended period for a significant number of Cinema titles to include the new SEI bits, even if it were to be adopted. New buttons on TV remotes may require re-tooling of the remote control, or replacing an existing function with UHD-SRM, both of which may be negatives for TV makers.

To help overcome these limitations, communication protocol can be introduced. Among its features, the protocol can be uniquely defined for UHDA without concerns of interoperability, nor backward compatibility issues. Under this mechanism, the content carrying video source device is aware of the capability of a connected video sink or display device so that it is able to enforce UHDA-SRM. The video source device can accurately communicate with the display device regarding the status of content type, so that the capable display device can enable Director's Mode correctly. In the main embodiments discussed in the following, the video source device can convert UHDA-specific SEI message for Content Type to an HDMI signal for Content Type. In addition to the protocol, additional processing can be introduced for the detection of video content that is a cinema type; the detection of cinema content may be used to enable UHDA-SRM. This cinema type detection may be used independently by the Sink or through communication with the Source using the new protocol or in conjunction with the new protocol.

Figure 4:
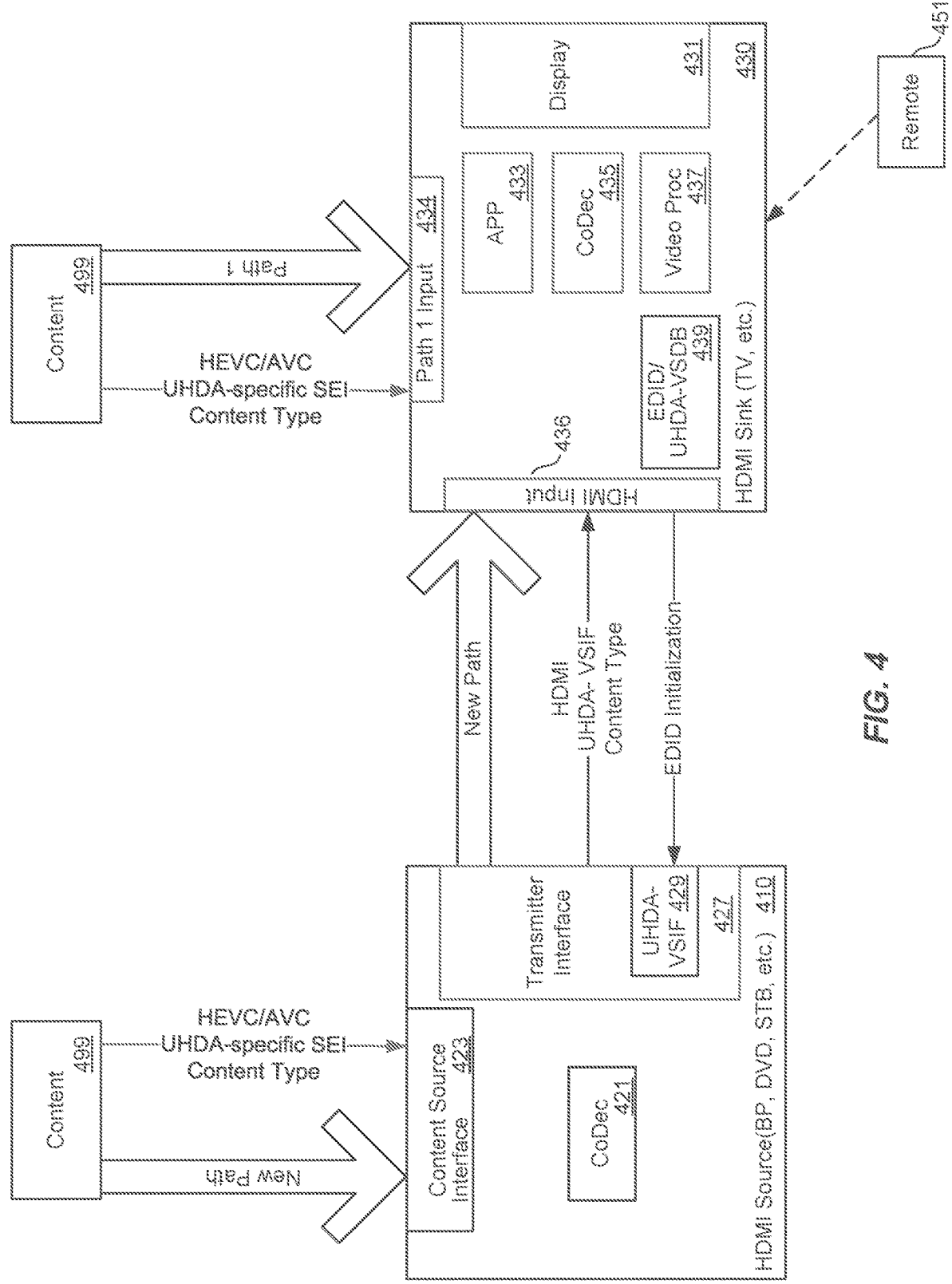
FIG. 4 illustrates an embodiment that provides a communication mechanism between a video source and a video sink for implementation of a specified display mode, such as UHDA-SRM.

FIG. 4 illustrates an embodiment that provides a communication mechanism between a video source and a video sink for implementation of a specified display mode, such as UHDA-SRM. FIG. 4 again includes a video (HDMI) sink that includes display 431, APP 433, CoDec 435, video processor 437, and remote 451, which can all be as described above with respect to the corresponding elements of FIG. 3. In some embodiments, the video sink 430 can still receive content 499 over Path 1 at Path 1 input 434 via a non-HDMI path, such as directly using a television antenna or via the internet through over-the-top (OTT) streaming.

The video sink 430 also is shown to include an EDID (Extended display identification data block 439. The EDID includes data on the display capabilities that the video sink 430 supports for the display of video content on display 431. At initialization, the video sink 430 can provide this information to the video source 410, as indicated at EDID Initialization signal between these devices. A sink which supports UHDA-SRM should present all the audio and video capability that the sink supports in its EDID. Additionally, if the sink supports the new communication protocol, then it may include a special UHDA Vendor Specific Data Block (VSDB) within its EDID. A video source 410 can determine if the video sink 430 will support a specified display mode, such as UHDA-SRM based on the presence of the UHDA VSDB.

Depending on the embodiment, the video source 410 can be a Blu-ray disc player (BP), a DVD (digital versatile disc) player, a set-top box (STB) or combination of these and other video sources. The video source 410 can be as described above with respect to the video source 110 of FIG. 1 and, in the shown embodiment, communicate with the video sink 430 by way of an HDMI interface at HDMI input 436 as described above with respect to FIG. 2. For purposes of this discussion, the video source 410 is explicitly shown to include content source interface 423, coder-decoder CoDec 421. Additionally, a transmitter interface 427 may including a UHDA-VSIF (Vendor Specific Info Frame) block 429.

The transmitter interface 427 in this example is an HDMI interface and can be taken include elements of both a plug or connector 123 for connection of an HDMI cable assembly 121 and Source TX 119 from FIG. 1. The content source interface 423 can similarly include both a physical interface, such as for the connection of a cable, and also elements to perform some of the processing for received video content, as described with respect to APP 333/433 of the video sink 330/430. The coder-decoder CoDec 421 can perform coding and decoding on video content received from the content source interface 423 and provide the resultant coded/decoded video content to the transmitter interface 427. The operations performed on the video content by these elements is discussed further in the following and can perform these functions through software run on a processing unit, hardware such as one or more ASICs, firmware, or various combinations of these.

FIG. 4 introduces a new path to provide the content 499 to the video sink 430, where this can be the same content as provided by Path 1 or different content. In this new path, the video content is provided to the video sink 430 with the information specifying a mode for displaying the content embedded within the blanking intervals of frames of the video content. The example discussed in the following will use an embodiment where the video source 410 and the video sink 430 communicate in a CTA-861 and HDMI format, and where the video source 410 converts the video content with an HEVC/AVC UHDA-Specific SEI to UHDA-VSIF (Vendor Specific Info Frame), and transports the specified content type over an HDMI link to the video sink 430 with frame accuracy. Alternatively, if the UHDA-Specific SEI messages are not present in the HEVC/AVC stream, the Source may detect that the video content is a cinema type by detection of 24 fps or by processing in the Source and communicate the presence of cinema to the Sink using UHDA-VSIF. The use of this new path allows for a user to have the same experience, whether the video content is delivered from an OTT, as illustrated by the content 499 supplied the video sink 430, or originates from media read by a player on the video sink, and provides more reliability when compared to Path 2 of FIG. 3.

In the new path, the HDMI source 410 device receives the video content, including a specification of a display mode to use when present the video content on a display. Depending on the embodiment, the video content can come to the HDMI source 410 from content source 499 over the content source interface 423, originate on the video source 410 by being read from media, and/or other sources. From an OTT, for example, the content as a HEVC/AVC bitstream that has a UHDA-specific SEI message embedded in it or cinema type may be detected by the Source by detection of 24 fps, or by processing in the Source The HDMI source 410 will also receive EDID information from the HDMI sink 430 over the HDMI interface at initialization, allowing the HDMI source 410 to know whether the HDMI sink 430 supports the specified display mode. The HDMI source 410 will format the video content into the HDMI format as a series of frames. If the EDID indicates that the video sink 430 supports the display mode specified by the SEI message or by cinema mode detection, the specified mode is embedded into UHDA-VSIF content type information embedding into the frames of the HDMI formatted video transmitted over the transmitter interface 427 to the video sink 430.

Some examples of the one or more of the display parameters that can be set when in the specified display mode can include: frame rate; dynamic range; color gamut; a transfer function for the display of the video content; and a definition level (level of resolution, such 4K or 8K for example) for the display of the video content. In some embodiments, the specification of one or more of these properties within the frames of video content supplied from the video source 410 to the video sink 430 can serve to specify a display mode for the presentation of video content. For example, a specific frame rate can invoke a specified presentation mode.

To take a specific example, "cinema" (i.e., a film originally produced for presentation in a movie theater) is typically shot at frame rates of 24 fps (frames per second). If the HDMI sink 430 receives video content from the HDMI source specifying this frame rate, the HDMI sink 430 can take this as having the intent of the specified presentation mode (the UHD-SRM specification) and the display on the video sink 430 can be entered into the "Director's Mode". Detection of cinema may be performed in the Source through other processing means.

In some embodiments, the receiver hardware of the HDMI sink 430 can have the capability of detecting input frame rate of content transmitted over HDMI interface with the HDMI source 410. For example, the display device of the HDMI sink 430 can "bias" the video source 410 to provide 24 fps by indicating a "Preferred Timing" in its EDID, and frame rate detection may be implemented in a video sink 430 using software only and without hardware changes. In many embodiments, detection of frame rate can be used as a reliable indicator of a specified presentation mode and has a high degree of back-compatibility.

Figure 5:
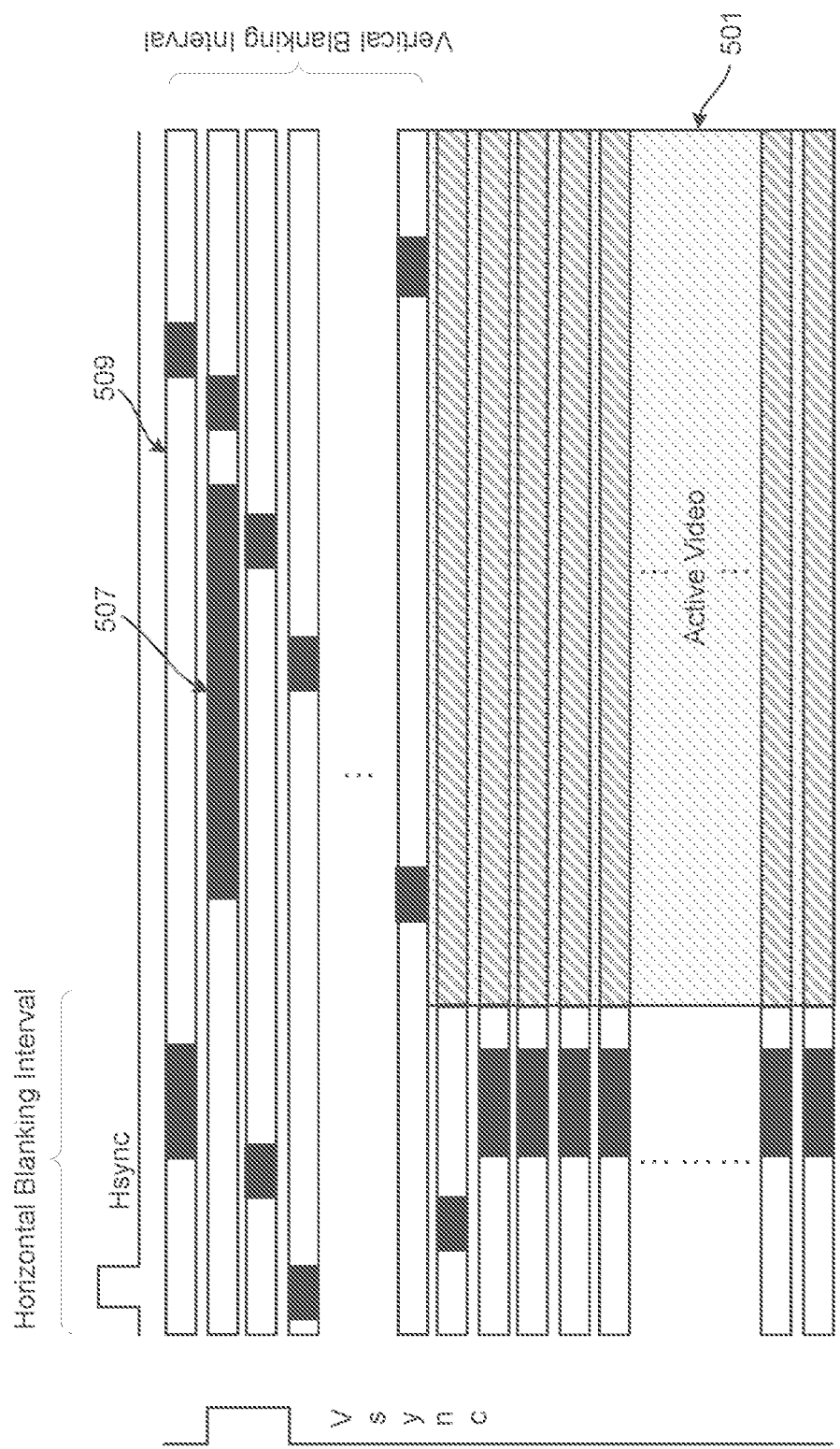
FIG. 5 is a schematic illustration of the structure of a frame of video data, illustrating the active video and blanking intervals of a video frame.

Returning to the more general embodiments where the specification to display the video signal in a particular display mode is embedded in a blanking interval of the frame, a stream of video data in HDMI format is made up of a series of frames, where each frame includes an active video portion, corresponding to the video data that will actually be seen on a television or other display, and additional portions. FIG. 5 is a schematic illustration a structure of a frame of video data.

When a video image is displayed on a television or other display 431, the image is formed of a series of rows of pixels presented in a sequence of frames. In FIG. 5, these pixels of active video 501 are represented by the lines with the diagonal hashing. Additionally, a preceding portion of each of these lines of active data pixels and a preceding number of lines are "blanking intervals", which is a portion of the frame not typically displayed. Theses blanking intervals are formed of a number of "blank pixels". The term "pixel" is sometimes used to refer to only the "active pixels" of the active video portion that is displayed, but as used here unless further qualified "pixel" can refer to either an "active pixel" of the active video portion or a "blank pixel" from a blanking interval. (In particular, although more generally applicable, the following discussion is primarily focused on the blank pixels of the blanking intervals because the blanking pixels carry the CTA data structures, i.e. AVI Info Frame and Vendor Specific Info Frames.) The origin and much of the terminology related to these blanking intervals is historical, from when televisions used cathode ray tubes that were illuminated by moving beams of electrons very quickly across the screen. Once the beam reached the edge of the screen, the beam was switched off and the deflection circuit voltages (or currents) are returned to the values they had for the other edge of the screen. This would have the effect of retracing the screen in the opposite direction, so the beam was turned off during this time and this part of the frame's pixel is the "horizontal blanking interval" of each line that precedes the portion of active video. At the end of the final line of active video in a frame, the deflection circuits would need to return from the bottom of the screen to the top, corresponding the "vertical blanking interval" of the first several lines of a frame that contain no active video. Although a modern digital display does not require the time for the deflection circuit to return from one side of a screen to the other, the blanking intervals, originally retained for back-compatibility, have been maintained for additional data, such as sub-titles or Closed-caption display data, audio data, and control data.

More specifically, FIG. 5 depicts a single frame of video, such as is transmitted from the transmitter interface 427 over an HDMI interface. A single frame is transmitted typically in 1/60 second. The frame of FIG. 5 shows 2 basic time periods within the frame, corresponding to the active video and blanking intervals. The active period typically uses about 85% of the frame's content, but FIG. 5 is drawn to focus on the blanking periods and is not drawn in proportion to the frame time.

For the example of FIG. 5, within the lines of (blank) pixels of the blanking periods or intervals, there are white periods (e.g., 509) and black periods (e.g., 507). The white portions are control periods and the black periods are for auxiliary data, such as audio data or control data. FIG. 5 also illustrates the horizontal synchronization pulse, or Hsync, that separates the horizontal lines, or scan lines, of a frame. The horizontal sync signal is a single short pulse which indicates the start of every line, after which follows the rest of the scan line. The vertical synchronization pulse, or Vsync, is also shown and is used to indicate the beginning of a frame or, in embodiment where a frame is made. up of alternating fields, to separate the fields. The vertical sync pulse occurs within the vertical blanking interval. The vertical sync pulse occupies the whole line intervals of a number of lines at the beginning and/or end of a scan when there is no active video.

When the video source 410 formats the video content into frames for transmission to the video sink 430, the specification of the mode in which to display the active video content of the frames can be placed in the blanking interval preceding the active, such as in the portion indicated at 507. In some embodiments, this information could only be included for frames when the specified display mode changes or at the beginning of a stream of video content. The embodiment discussed in the following include this information within each frame to provide frame-by-frame accuracy, so that if the source of the content is changed, for example, the display can change with the first frame of the changed content. This is illustrated with respect to FIG. 6, which continues with the UHDA-SRM example for data transmitted in an HDMI format and the information specifying the mode embedded into UHDA-VSIF content type information.

Figure 6:
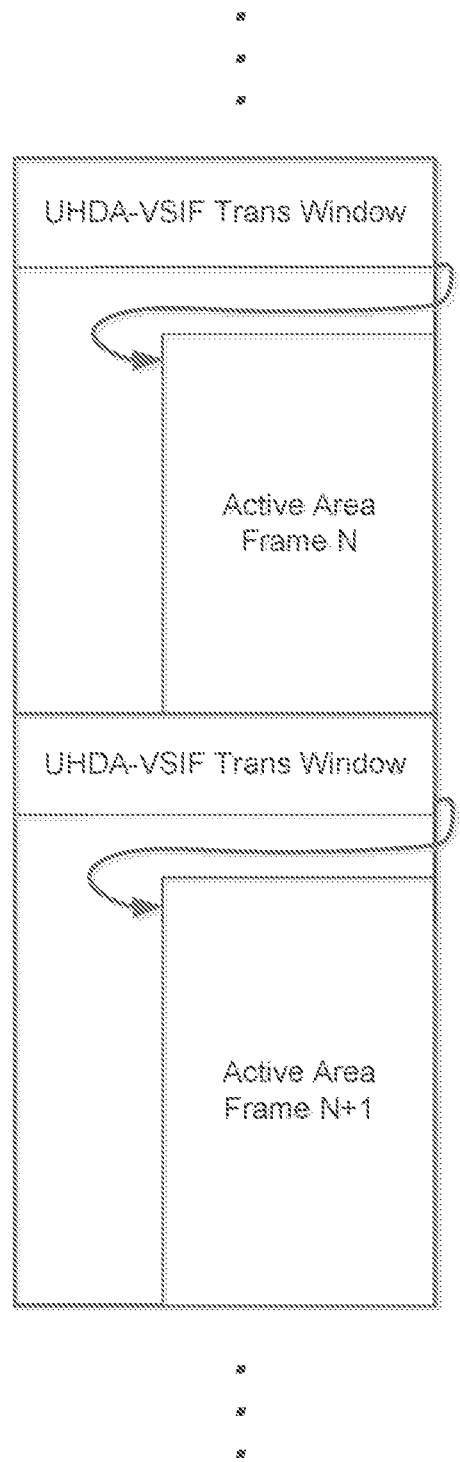
FIG. 6 is a schematic representation of a pair of consecutive frames supplied from the HDMI source to the HDMI sink.

FIG. 6 is a schematic representation of a pair of consecutive frame supplied from the HDMI source 410 to the HDMI sink 430. Considering an example where the video source 499 is received by the HDMI source 410 over the content source interface 423, if the HDMI source 410 (in UHDA-SRM specification compliant example) detects an UHDA-specific SEI message embedded in the HEVC/AVC bitstream, or the HDMI source detects that the data is a cinema type, it can signal to the Sink to enter Director's Mode using the UHDA-VSIF. More generally, the specification of the display mode embedded in the video content of the received format is converted by a video source 410 into the content type specification to be embedded in the frames of video content in the video signal of the format being sent to the video sink 430.

For the frames of video content being sent from the video source 410 to the video sink 430, the specification of display is embedded in blanking interval pixels of the frame preceding the active video pixels. Continuing with the example of the communication mechanism for UHDA-VSIF and content in an HDMI format, if the HDMI source 410 is compliant to UHDA-SRM Specification, then the HDMI source 410 can apply the following rule for the transmission of UHDA-VSIF: when the InfoFrames are sent, they can be sent within the blanking area immediately preceding the active video region to which the InfoFrames apply, beginning on the first video blank pixel that immediately follows the last active video pixel of a video frame/field and ending [Floor(Vblank/2)] lines prior to the start of the next active region, where parameter Vblank is the number of lines in the vertical blanking area.

This is represented schematically in FIG. 6, which shows a Frame N followed by the subsequent Frame N+1. Each frame for which the active video is to be presented in the specified display mode has this specified in a UHDA-VSIF transfer window embedded in blank pixels at the first part of the frame. This information is then applied to the display of the active video pixels in the following active area of the frame, as indicated by the arrow. After the active area of Frame N comes Frame N+1, which again has the information embedded in the UHDA-VSIF transfer window following the active area of Frame N. An HDMI sink 430 that indicates support for UHDA-SRM (or, more generally, a specified display mode) applies the packet content carried by UHDA-VSIF to the active video region of the same frame following reception of these InfoFrames.

Figure 7:
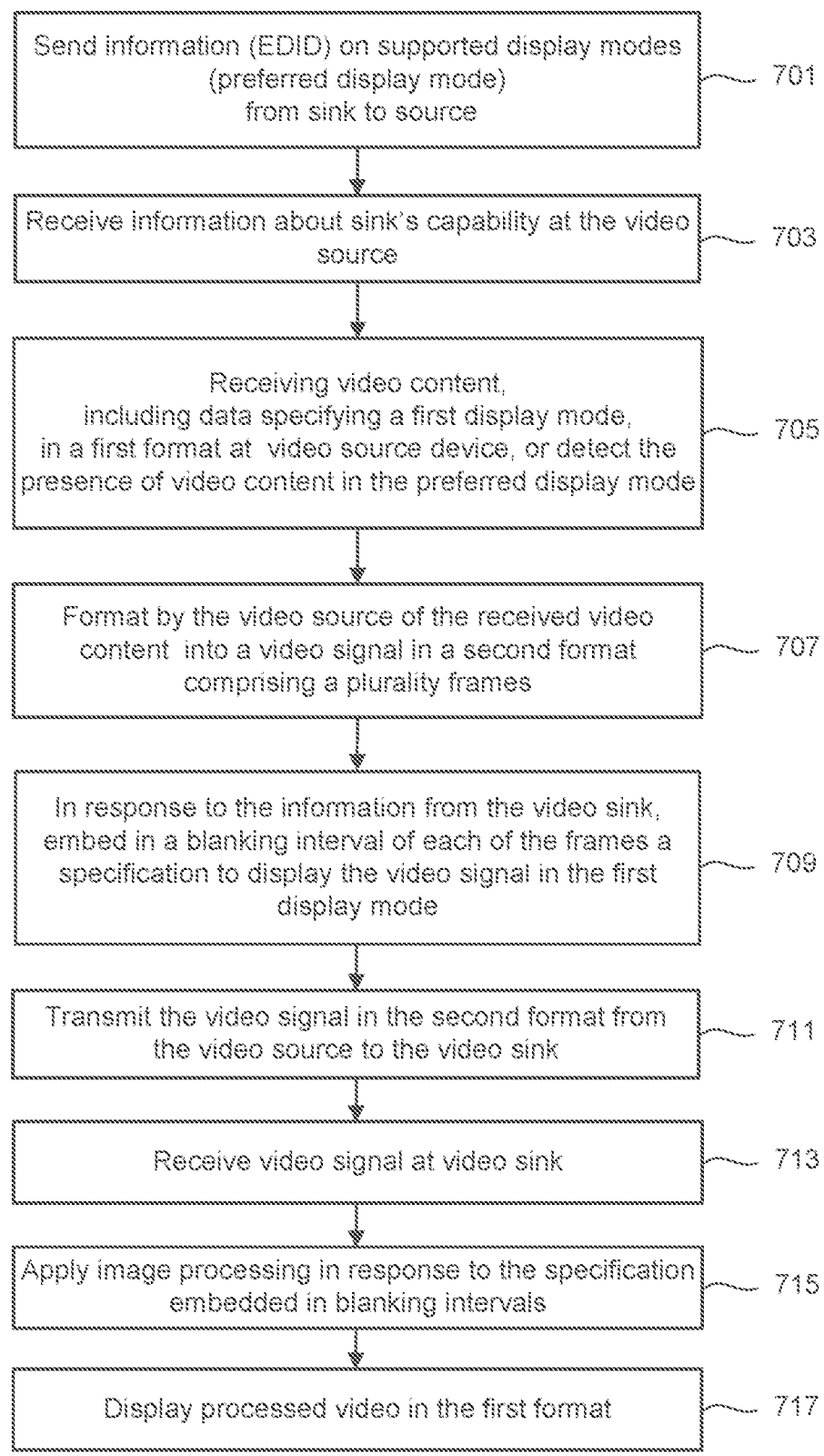
FIG. 7 is a flowchart to illustrate embodiments of implementing the mechanism for communicating the use of the specified display mode from a video source to video sink.

FIG. 7 is a flowchart to illustrate embodiments to implement a mechanism for communicating the use of the specified display mode from a video source 410 to video sink 430. At 701 the HDMI sink 430 sends the information (e.g., EDID) on its capabilities, including the display modes that the HDMI sink 430 supports for display of video content, where this information is received at the HDMI source 410 at 703. In some embodiments, in addition to specifying display modes that the HDMI sink 430 supports, the EDID may also indicate that a particular presentation mode is preferred.

At 705, the video source 410 receives the video content in a first format, including data specifying a display mode. For example, this content could be part of the content 499 received over the content source interface 413 as a compressed video bitstream with an embedded HEVC/AVC UDHA-specific SEI content type specification. In other example, this could video content read off of media by the HDMI source 410, such video content in an MPEG format read from a Blu-ray disc. In some embodiments, this data could be a specified frame rate, such as the 24 fps frame rate, that is a preferred display mode. In FIGS. 7, 701 and 703 are shown to precede 705, but 701 and 703 can be performed after or concurrently with 705, but are commonly part of the initialization process.

At 707, the HDMI source 410 reformats the video content into the format (HDMI in this embodiment) in which it will be transferred to the HDMI sink 430. This can include decoding the received video content in CoDec 421 from the format in which it is received and reformatted in the frames of the HDMI format in which it will be sent to the HDMI sink 430. If the HDMI sink 430 has indicated at 701 that it supports the specified display mode, this specification could be embedded in the blanking intervals preceding the active video portion of the frames at 709. (For the embodiments described above where the specification is a frame rate, this specification could be a frame rate of 24 fps, for example.) If the HDMI sink 430 has indicated a preferred display mode and this does not coincide with the specified display, the HDMI sink 430 can be instructed to override the preferred display mode in favor of the specified display mode. Although represented as separate in FIGS. 7, 707 and 709 will typically be performed together when the video content is formatted for sending to the video sink 430.

The video content formatted into the frames is transmitted over the transmitter interface 427 at 711 and, at 713, the frames are received at the HDMI sink 430. At 715, the HDMI sink 430 applies image processing the received frames in response to the specification embedded in each of the frame's blanking intervals. The processed video content can then be displayed on display 431 by the HDMI sink 430 at step 717 if the sink is a television or other display device or, if the HDMI sink 430 is not the ultimate display but an intermediate device, the processed video can be retransmitted.

Considering the communication mechanism at 701 of FIG. 7 further for the example of UHDA-SRM using a Vendor Specific Data Block (VSDB), this information is represented at block 439 in HDMI sink 430. The display modes supported by HDMI sink 430 can be transmitted in the VSDB as part of the EDID in the HDMI initialization process. In one set of embodiments the VSDB is defined by CTA-861, as an option to place data, which are not specified by CTA-861, but which a manufacturer may care to use. In this arrangement, the VSDB is to carry vendor-specific IEEE (Institute of Electrical and Electronics Engineers) Organizational Unique Identifiers (OUI) as the header. The payload is defined by the organization, so that UHDA can define the payload of its own VSDB and include an SRM capability indicator.

UHDA-VSDB (VSDB with UHDA specific OUI and SRM status), if available, can be contained by the HDMI sink's EDID Vendor-Specific Data Block 439, as a static capability indicator. When the connection between the HDMI source 410 and HDMI sink 430 is initialized, HDMI sink 430 will send (701 of FIG. 7) the EDID including UHDA-VSDB and other information over a control line as part of the HDMI link. Once the EDID is received by HDMI source device 410 at 703 of FIG. 7, the HDMI source 410 will know the UHDA-SRM capability of the HDMI sink 430.

FIG. 8 illustrates a format for an embodiment of a UDHA vendor specific data block. The Length field [5 bits] indicates the total length of data block, not including this byte, and a minimum value of 5 and a maximum value 31. The field UHDA IEEE OUI [3 Bytes] holds the IEEE Organizationally Unique Identifier (OUI) designated to UHD-A. The field Version [1 Byte] indicates the version number associated with the contents of the UHDA-VSDB, where sink devices compliant with the UHDA Specification set this value to 1. The field SRM [1 bit] indicates that the HDMI sink 430 has the capability to support UHDA-SRM: When set (=1) the HDMI sink 430 supports UHDA-SRM; and when reset (=0), the HDMI sink 430 doesn't support UHDA-SRM.

Considering the communication mechanism 709 of FIG. 7 for an embodiment using Vendor Specific InfoFrame (VSIF) and HDMI communication, this information is represented a block 429 of FIG. 4. The VSIF can be defined by CTA-861 as an option for an HDMI source 410 to dynamically communicate with an HDMI sink 430. In the embodiment shown in FIG. 9, the VSIF carries vendor-specific IEEE OUI as the header, where the payload is defined by the organization. UHDA can define its VSIF payload, which matches its own VSDB (inside block 439 on HDMI sink 430) and synchronously indicate the content type change on the fly. In the embodiment presented in FIG. 6, the UHDA-VSIF (VSIF with UHDA specific OUI and accurate content type), if available, is transmitted once per frame, at a specified location within the frame. Once the UHDA-VSIF is received by the HDMI sink 430 and SRM is detected, the video content can be presented on the display 431 accordingly to preserve "the creative intent" which is originated by the film maker.

Figure 11:
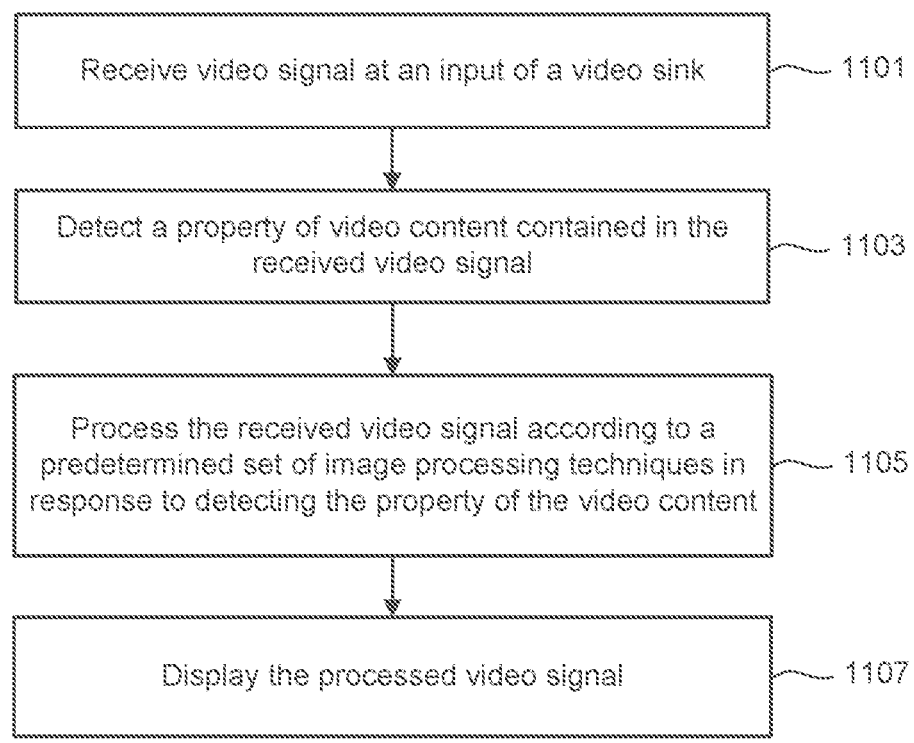
FIG. 11 is a flowchart to illustrate embodiments to implement a mechanism for the determination of a specified presentation mode through local processing on the video sink.
Figure 12:
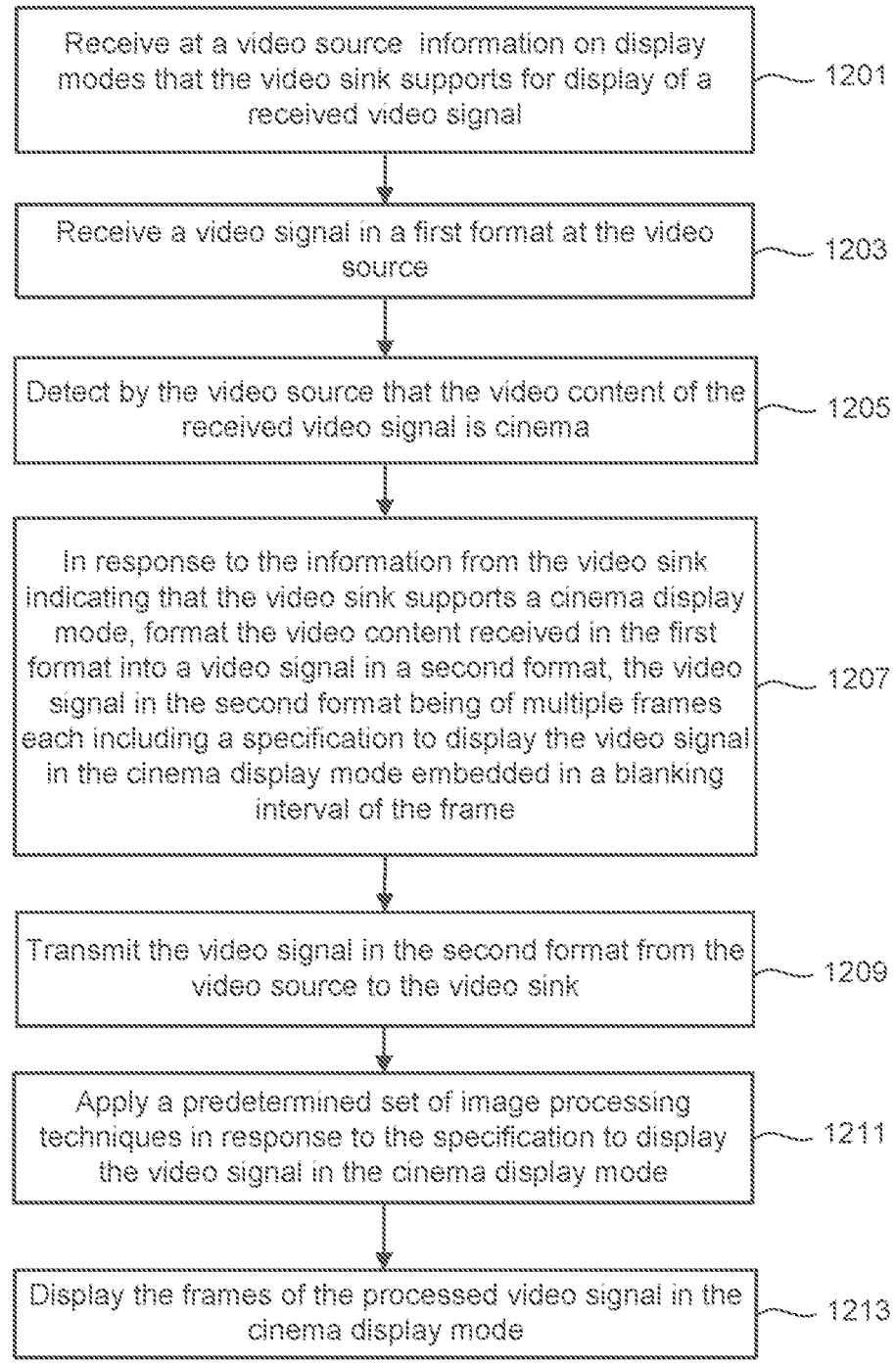
FIG. 12 is a flowchart to illustrate embodiments to implement a mechanism for the determination of a specified presentation mode through local processing on the video source.

FIG. 9 illustrates an embodiment of a format for a UDHA vendor specific InfoFrame for use in an embodiment of a communication mechanism for UHDA-VSIF. The table of FIG. 9 illustrates an embodiment of a format for an UDHA vendor specific InfoFrame packer header. In FIG. 9, the Checksum field [1 Byte] is the checksum of the InfoFrame and is calculated such that a byte-wide sum of all the three bytes of the Packet Header and all valid bytes of the UHDA-VSIF packet contents (determined by Length), plus the Cheksum itself, equals zero. The field UHDA IEEE OUI [3 Bytes] is used for the IEEE organizationally Unique Identifier (OUI) designated to UHD-A. The Version field [1 Byte] supplies the version number associated with the contents of the UHDA-VSIF, where a video source 410 compliant with the UHDA Specification would set this value to 1. The field for Content Type [2 Bytes] is used to indicates the type of content for current frame:

16'h0000: Graphics
16'h0001: Photo
16'h0002: Cinema
16'h0003: Game
16'h0004-16'hFFFE: Reserved
16'hFFFF: Unspecified As mentioned above, FIGS. 4-9 have mainly focused on the addition of a UHDA specific communication protocol between the video source 410 and the video sink 430, where these embodiments can include the elements of: the EDID of the television or other video sink 430 includes a UHDA-VSDB that a TV is UHDA-Director's Mode capable; and that the video source 410 communicates with the video sink 4 using UHDA-VSIF. As mentioned above, other embodiments can also include detection of a specified presentation mode, such as a cinema mode when the video content is of video type, based upon the detection of a frame rate (e.g., 24 fps) or the detection of cinema content via image processing techniques that detect motion update at 24 fps. FIGS. 10-12 consider these second set of embodiments further.

FIG. 10 is a 2×2 table to illustrate the different modes described here. The rows correspond to whether the detection is performed by the video sink (330/430) or by the video source (430). The columns correspond to whether cinema, or other specified presentation format, detection is based on UHDA SEI messages embedded in HEVC or Audio Video Coding (AVC), or is detected through local processing. The upper left block (sink detects, UHDA SEI messages embedded in HEVC or AVC) corresponds to the arrangement described with respect to FIG. 3, where the video content is provided to the video sink 330 over Path 1 with HEVC/AVC UHDA-specific SEI content type or over Path 2 with HDMT AVI InfoFrame content type. The lower left block corresponds to when the video source 410 decodes embedded SEI messages, as described above with respect to FIGS. 4-9. The upper right block and the lower right block respectively correspond to when the detection is done through local detection on the video sink 330/430, and is described further with respect to FIG. 11, and on the video source 410, and is described further with respect to FIG. 12.

FIG. 11 is a flowchart to illustrate embodiments to implement a mechanism for the determination of a specified presentation mode through local processing on the video sink 330/430. In a specific example, this can be the detection of cinema mode by a television. At 1101, a video signal is received at video sink 330/430 over Path 1 at input 334/434 or Path 2 at input 336/436. A property of video content contained in the received video signal is detected at 1103, where it should be noted that this is a property of the video content itself, rather than a message specifying a content type, such as in a UHDA-specific SEI message in an HEVC/AVC compressed bitstream. For example, the property of the video content can be a frame rate, such as detection of a frame rate of 24 fps or detection of motion update at 24 fps. This detection and subsequent processing at 1105 can be performed by one or more video processing circuits on the video sink 330/430, which can include the video processing 337 or codec 335 and be implemented through hardware (such as video processing ASICs), software, firmware, and various combination of these.

At 1105, the received video signal is processed according to a predetermined set of image processing techniques in response to detecting the property of the video content, with the processed video signal displayed on the television or other display 331 at 1107.

FIG. 12 is a flowchart to illustrate embodiments to implement a mechanism for the determination of a specified presentation mode through local processing on the video source 410. In the arrangement of FIG. 12, the detection is similar to the sink-side detection mode of FIG. 11, with the source-sink communications being similar to the process of FIG. 7. More specifically, beginning at 1201, the video source 410 receives information on display modes that the video sink 430 supports for display of a received video signal, where the process can be similar to that described with respect to 703 of FIG. 7. At 1203, a video signal in a first format at the video source 430, where the reception can again be as described with respect to 705 of FIG. 7.

The detection by the video source that the video content of the received video signal is cinema or other specified presentation mode is performed at 1205, where this detection can be similar to that of 1103 of FIG. 11 and performed by codec 421 and/or other processing elements on the video source 410.

In response to the information from the video sink 430 at 1201 indicating that it supports a cinema or other specified display mode, at 1207 the video source 410 formats the video content received in the first format into a video signal in a second format, the video signal in the second format comprising a plurality of frames, each of the frames including a specification to display the video signal in the cinema display mode embedded in a blanking interval of the frame. The process of 1207 can be similar to that described above with respect to 707 and 709 of FIG. 7. As at 711 of FIG. 7, at 1209 the video signal in the second format from the video source 410 to the video sink 430.

Once received at the video sink 430, the video sink can apply a predetermined set of image processing techniques by the sink to the video signal in response to the specification to display the video signal in the cinema display mode embedded in the blanking interval of the frames at 1211. At 1213, the video sink 430 can display the frames of the processed video signal in the cinema or other specified display mode, where 1211 and 1213 can be implemented as described above with respect to 715 and 717 of FIG. 7.

Considering the detection and processing for FIGS. 11 and 12 further with the example of the cinema mode and 24 fps embodiments, these processes are to detect that the motion update rate of the incoming video stream is 24 times per second. This is to detect the situation in which the original video content was shot on film at 24 frames per second, then converted to a video stream. For example, one way for this to occur is if the incoming video stream presents frames at the rate of 24 frames/second. In this case, the motion update rate and the frame rate are the same number: motion is updated 24 times/second, and frames arrive at the video sink 330/430 or video source 410 at 24 frames/second.

In other cases, however, a motion update rate of 24 fps may be carried in a video stream with a different frame rate. For example, a movie may have been shot at 24 fps with a film camera, and that movie was converted to video for display on a television. For this discussion, the frames of the original content can be labelled as follows: A B C D E, where each letter represents a complete frame of the original movie at 24 frames per second.

For display on a television, the original content is often converted to a different frame rate. For example, suppose the video content arrives at the video sink 330/430 or video source 410 at 48 fps, and that the individual frame sequence is as follows: A A B B C C D D E E . . . . In this case, the original frames are sent 2 times each for a video signal rate of 48 fps, but the rate that motion changes is still 24 fps. In another example, the video content arrives at the at the video sink 330/430 or video source 410 at 60 fps with a sequence such as A A A B B C C C D D E E E . . . . In this 60 fps example, the original frames are transmitted 3 times, then the next 2 times, then the next 3 times, the next 2 times, and so on, so that the video signal is 60 fps, but the average motion update rate is still 24 fps. In this 60 fps case, over a sequence of 5 frames (at 60 fps), there are 2 frames of the original movie, so that the ratio 5/2 is equal to 60 fps/24 fps. This is a common conversion technique to transmit Cinema frames (24 fps) to video stream rate of 60 fps.

Consequently, the image processing of flows of FIGS. 11 and 12 can include the processing that is required to analyze a video stream and detect that the original motion update rate of the video content is 24. In the example FIGS. 11 and 12, the video sink 330/430 or video source 410 can analyze the stream of frames and detect which frames are the same and which ones are different, and from that, determine the original motion update rate is 24 fps, and detect that the original content is Cinema, shot at 24 fps, even if it arrives at the TV in a stream at 60 fps.

The described mechanisms allow for a consistent presentation of video content to a display or other video sink that is to be present in a specified display mode by embedding the specification of this display mode with the blanking intervals of the frames of video supplied to the display device. The techniques can provide a number of advantages: backward compatible with HDMI eco-system and existing devices; no concern for interoperability issue, compared with the method through AVI InfoFrame Content Type signaling; based on existing methods which are proven at very low complexity; and enables UHD-A to define additional methods for potential problem solving in the future or feature additions which are not foreseeable for now.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing a video signal to a video sink through an HDMI (High-Definition Multimedia Interface), comprising:
   receiving, at a video source from the video sink information on display modes that the video sink supports for display of a received video signal;
   receiving video content in a first format at the video source, the video content including data specifying a first display mode for display of the video content;
   in response to the information on the display modes from the video sink indicating that the video sink supports the first display mode, formatting, by the video source, the video content received in the first format into a video signal in a second format for transmission of the video signal, the video signal in the second format comprising a plurality of frames, each of the plurality of frames including a specification to display the video signal in the first display mode by the video sink, the specification embedded in a blanking interval of each frame; and
   transmitting the video signal in the second format from the video source to the video sink.

2. The method of claim 1, wherein the video sink includes a display and the method further comprises:
   applying a set of image processing techniques by the video sink to the video signal according to the specification embedded in the blanking interval of each frame; and
   displaying, by the video sink, the processed video signal on the display in the first display mode.

3. The method of claim 1, wherein, in the first format, portions of the video content corresponding to active video are compressed.

4. The method of claim 3, wherein the active video portions of the video content are compressed in a Moving Picture Experts Group (MPEG) format.

5. The method of claim 4, wherein the data specifying the first display mode is received as a supplemental enhancement information (SEI) message.

6. The method of claim 1, where the video content in the first format is received from an over-the-top (OTT) content source.

7. The method of claim 1, where the video content in the first format is received from a television antenna.

8. The method of claim 1, where the video content in the first format is received from an internet connection.

9. The method of claim 1, wherein receiving the video content in the first format includes:
   reading by the video source the video content from a medium.

10. The method of claim 9, wherein the medium is a Blu-ray disc.

11. The method of claim 9, wherein the medium is a DVD (digital versatile disc).

12. The method of claim 1, wherein:
   receiving, at the video source from the video sink, the information on the display modes that the video sink supports for display of the received video signal includes: receiving information that the video sink supports a plurality of display modes, including the first display mode and a second display mode that the video sink specifies as preferred display modes; and
   the specification to display the video signal in the first display mode instructs the video sink to override the second display mode.

13. The method of claim 1, wherein the data specifying the first display mode specifies a dynamic range for the display of the video content.

14. The method of claim 1, wherein the data specifying the first display mode specifies a color gamut for the display of the video content.

15. The method of claim 1, wherein the data specifying the first display mode specifies a transfer function for the display of the video content.

16. The method of claim 1, wherein the data specifying the first display mode specifies a definition level for the display of the video content.

17. The method of claim 1, wherein the data specifying the first display mode specifies a frame rate for the display of the video content.

18. A video source device, comprising a content source interface configured to receive video content, including data specifying a first display mode for display of the video content, in a first format;
   a transmitter interface configured to receive, from a video sink, information on display modes that the video sink supports for display of a received video signal, and to transmit, to the video sink a video signal in a second format; and
   a coder-decoder configured to format the received video content in the first format into the video signal in the second format for transmission of the video signal in response to the information on the display modes from the video sink indicating that the video sink supports the first display mode, the video signal in the second format comprising a plurality of frames, each of the plurality of frames including a specification to display the video signal by the video sink in the first display mode, the specification embedded in a blanking interval of each frame.

19. The video source device of claim 18, wherein the data of the video content specifying the first display mode is a frame rate for the video content.

20. The video source device of claim 18, wherein the video source device further comprises:

a media reader configured to read the video content from a medium and supply the video content to the content source interface.

21. The video source device of claim 18, wherein:

the information from the video sink on the display modes that the video sink supports for display of the received video signal includes information that the video sink supports a plurality of display modes, including the first display mode and a second display mode that the video sink specifies as preferred display modes; and the specification to display the video signal in the first display mode instructs the video sink to override the second display mode.

22. The video source device of claim 18, wherein the data specifying the first display mode specifies a dynamic range for the display of the video content.

23. The video source device of claim 18, wherein the data specifying the first display mode specifies a color gamut for the display of the video content.

24. The video source device of claim 18, wherein the data specifying the first display mode specifies a transfer function for the display of the video content.

25. A video system, comprising:

a video sink configured to supply information on display modes that the video sink supports for display of a received video signal, to receive a video signal including a specification to display the video signal in a specified display mode, and to display the video signal in the specified display mode; and a video source configured to:

receive video content, including data specifying a first display mode, in a first format;

receive, from the video sink the information on the display modes that the video sink supports for display of the received video signal; and in response to the information on the display modes from the video sink indicating that the video sink supports the first display mode, format the received video content in the first format into the video signal in a second format for transmission of the video signal in the second format, and transmit the video signal in the second format to the video sink, wherein the video signal in the second format comprises a plurality of frames, each of the frames including a specification to display the video signal by the video sink in the first display mode, the specification embedded in a blanking interval of each frame.

26. The video system of claim 25, where in the video sink is further configured to apply a set of image processing techniques to the video signal according to the specification embedded in the blanking interval of each frame, wherein the video sink displays the processed video signal.

27. The video system of claim 25, wherein portions of the video content corresponding to active video are compressed in the first format.

28. The video system of claim 25, wherein:

the information on the display modes that the video sink supports includes information that the video sink supports a plurality of display modes, including the first display mode and a second display mode that the video sink specifies as preferred display modes; and the specification to display the video signal in the first display mode instructs the video sink to override the second display mode.

\* \* \* \* \*